US011024874B2

United States Patent
Miyamae et al.

(10) Patent No.: US 11,024,874 B2
(45) Date of Patent: Jun. 1, 2021

(54) LITHIUM SECONDARY BATTERY INCLUDING NONAQUEOUS ELECTROLYTE HAVING LITHIUM-ION CONDUCTIVITY

(71) Applicant: Panasonic Intellectual Property Management Co., Ltd., Osaka (JP)

(72) Inventors: Ryohei Miyamae, Osaka (JP); Akira Kano, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 106 days.

(21) Appl. No.: 16/392,570

(22) Filed: Apr. 23, 2019

(65) Prior Publication Data

US 2019/0372153 A1 Dec. 5, 2019

(30) Foreign Application Priority Data

May 31, 2018 (JP) .............................. JP2018-105699

(51) Int. Cl.
*H01M 10/0525* (2010.01)
*H01M 4/134* (2010.01)
(Continued)

(52) U.S. Cl.
CPC ....... *H01M 10/0525* (2013.01); *H01M 4/134* (2013.01); *H01M 4/382* (2013.01);
(Continued)

(58) Field of Classification Search
CPC ............... H01M 10/0587; H01M 4/13; H01M 10/0525; H01M 10/052; H01M 2004/027
(Continued)

(56) References Cited

U.S. PATENT DOCUMENTS

2013/0071739 A1\* 3/2013 Tajima .................. H01G 11/66
429/211
2015/0280212 A1 10/2015 Son et al.
(Continued)

FOREIGN PATENT DOCUMENTS

EP 3537523 A1 9/2019
JP 2001-243957 9/2001
(Continued)

OTHER PUBLICATIONS

Pitt et al., "Electrical Properties of Epoxy Resins," Dec. 1957, IRE Transactions on Component Parts, vol. 4, Issue: 4) (Year: 1957).\*
(Continued)

*Primary Examiner* — Gary D Harris
(74) *Attorney, Agent, or Firm* — McDermott Will and Emery LLP

(57) ABSTRACT

A lithium secondary battery includes a positive electrode, a negative electrode, a separator, and a nonaqueous electrolyte having lithium-ion conductivity. The positive electrode contains a positive electrode active material containing lithium. The negative electrode faces the positive electrode. The separator is disposed between the positive and negative electrodes. The negative electrode includes a negative electrode current collector. The negative electrode current collector includes a layer and protrusions. The layer has a first surface on which lithium metal is deposited during charge. The protrusions protrude from the first surface. At least one of the protrusions includes a conductive material and an insulative material.

20 Claims, 4 Drawing Sheets

(51) Int. Cl.
    *H01M 4/38*       (2006.01)
    *H01M 4/66*       (2006.01)
    *H01M 4/02*       (2006.01)

(52) U.S. Cl.
    CPC ........ *H01M 4/66* (2013.01); *H01M 2004/021* (2013.01); *H01M 2004/027* (2013.01); *H01M 2004/028* (2013.01)

(58) Field of Classification Search
    USPC ...................................... 429/218.1
    See application file for complete search history.

(56) References Cited

U.S. PATENT DOCUMENTS

| | | |
|---|---|---|
| 2016/0020461 A1 | 1/2016 | Yang |
| 2017/0200943 A1 | 7/2017 | Kawakami |

FOREIGN PATENT DOCUMENTS

| | | |
|---|---|---|
| JP | 2016-527680 | 9/2016 |
| WO | 2018/091844 A1 | 5/2018 |

OTHER PUBLICATIONS

The Extended European Search Report dated Nov. 27, 2019 for the related European Patent Application No. 19169175.7.

\* cited by examiner

LITHIUM SECONDARY BATTERY INCLUDING NONAQUEOUS ELECTROLYTE HAVING LITHIUM-ION CONDUCTIVITY

BACKGROUND

1. Technical Field

The present disclosure relates to a lithium secondary battery that includes a nonaqueous electrolyte having lithium-ion conductivity.

2. Description of the Related Art

Nonaqueous electrolyte secondary batteries have been used in the information and communications technologies (ICT), such as personal computers and smartphones, and for automotive use, power storage use, and the like. There has been a demand for a further increase in the capacities of nonaqueous electrolyte secondary batteries used in these applications. Known examples of high-capacity nonaqueous electrolyte secondary batteries include lithium ion batteries. Although it is possible to increase the capacity of a lithium ion battery by using, for example, graphite in combination with an alloy active material, such as a silicon compound, as a negative electrode active material of the lithium ion battery, the increases in the capacities of lithium ion batteries appear to be reaching their limits.

Lithium metal secondary batteries (hereinafter, referred to as "lithium secondary batteries") have the potential to serve as a nonaqueous electrolyte secondary battery having a higher capacity than lithium ion batteries. In a lithium secondary battery, lithium metal is deposited on a negative electrode during charge, while the lithium metal dissolves in a nonaqueous electrolyte during discharge.

There have been attempts to improve the shape and the like of a negative electrode current collector included in a lithium secondary battery in order to limit the degradation of the properties of the battery which may be caused by dendritic deposition of lithium metal on the negative electrode. For example, in Japanese Unexamined Patent Application Publication No. 2001-243957, the ten-point average roughness Rz of the surface of the negative electrode current collector on which lithium metal is to be deposited is limited to be 10 µm or less. The lithium secondary battery proposed in Japanese Unexamined Patent Application Publication (Translation of PCT Application) No. 2016-527680 includes a negative electrode including a porous metal current collector and lithium metal intercalated in the pores of the current collector.

SUMMARY

One non-limiting and exemplary embodiment provides a lithium secondary battery capable of reducing the expansion of a negative electrode which may be caused by lithium metal deposited on the electrode during charge.

In one general aspect, the techniques disclosed here feature a lithium secondary battery including a positive electrode, a negative electrode, a separator, and a nonaqueous electrolyte having lithium-ion conductivity. The positive electrode contains a positive electrode active material containing lithium. The negative electrode faces the positive electrode. The separator is disposed between the positive and negative electrodes. The negative electrode includes a negative electrode current collector. The negative electrode current collector includes a layer and protrusions. The layer has a first surface on which lithium metal is deposited during charge. The protrusions protrude from the first surface. At least one of the protrusions includes a conductive material and an insulative material.

The lithium secondary battery according to an embodiment of the present disclosure may reduce the expansion of a negative electrode which may be caused by lithium metal deposited on the electrode during charge. Consequently, the lithium secondary battery according to the present disclosure may have an improved discharge capacity and improved safety.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
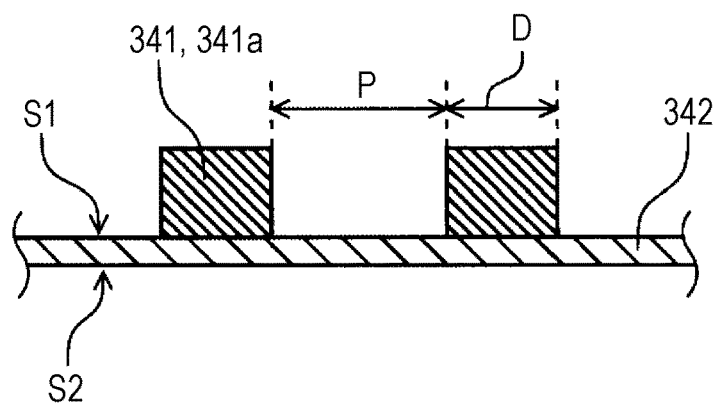
FIG. 1 is a schematic cross-sectional view of a negative electrode current collector according to an embodiment of the present disclosure.

Underlying Knowledge Forming Basis of the Present Disclosure

The embodiments disclosed herein relate to a lithium secondary battery that includes lithium metal used as a negative electrode active material and specifically to improvement of a negative electrode current collector. While a lithium secondary battery is charged, lithium metal may be deposited on the negative electrode in a dendritic pattern. The formation of the dendrites results in an increase in the specific surface area of the negative electrode, which may lead to an increase in the occurrence of side reactions. As a result, the discharge capacity and cycle characteristic of a lithium secondary battery are likely to become degraded. In this regard, it is suggested in Japanese Unexamined Patent Application Publication No. 2001-243957 that setting the ten-point average roughness Rz of the lithium deposition surface of the negative electrode to be 10 µm or less may reduce formation of the dendrites and enable a high charge/discharge efficiency.

The negative electrode of a lithium secondary battery is particularly likely to significantly expand as a result of lithium metal deposited on the negative electrode during charge. Note that, the expression "expansion of the negative electrode" used herein means an increase in the total volume of the negative electrode and lithium metal deposited on the negative electrode. The expansion of the negative electrode becomes particularly significant in the case where lithium metal is deposited on the negative electrode in a dendritic pattern. In order to absorb the expansion of the negative electrode which may occur during charge and discharge, for example, a porous negative electrode current collector that is composed of copper or nickel and has a porosity of 50% to 99% and a pore size of 5 to 500 μm is used in Japanese Unexamined Patent Application Publication (Translation of PCT Application) No. 2016-527680. However, since a negative electrode current collector is electrically conductive, lithium metal may be deposited on every surface of a negative electrode current collector even in the case where the negative electrode current collector has rough surfaces as in Japanese Unexamined Patent Application Publication No. 2001-243957 or the negative electrode current collector is porous as in Japanese Unexamined Patent Application Publication (Translation of PCT Application) No. 2016-527680. Thus, it has been difficult to reduce the change in the volume of the negative electrode to a sufficiently low degree.

The inventors of the present invention conducted extensive studies in order to address the above issues and, as a result, conceived the lithium secondary battery according to the present disclosure. A lithium secondary battery according to an embodiment of the present disclosure includes a positive electrode containing a positive electrode active material containing lithium; a negative electrode facing the positive electrode; a separator disposed between the positive and negative electrodes; and a nonaqueous electrolyte having lithium-ion conductivity. The negative electrode includes a negative electrode current collector that includes a first surface on which lithium metal is deposited during charge. The negative electrode current collector includes protrusions protruding from the first surface. At least a portion of at least one of the protrusions is composed of an insulative material.

In the lithium secondary battery according to the embodiment of the present disclosure, the protrusions protruding from the first surface of the negative electrode current collector enable spaces in which lithium metal may be deposited to be created in the vicinity of the first surface. This may reduce the change in the volume of the negative electrode which is caused by deposition of the lithium metal. In addition, even in the case where lithium metal is deposited in a dendritic pattern, the dendrites may be accommodated in the spaces created in the vicinity of the first surface. This may reduce the occurrence of internal short-circuit. Therefore, the lithium secondary battery according to the embodiment of the present disclosure may be also advantageous in terms of safety.

In the case where the protrusions include a conductive material, lithium metal may be deposited on the surfaces of the protrusions. In the present disclosure, since at least a portion of at least one of the protrusions is composed of an insulative material, the deposition of lithium metal on the surface of at least one of the protrusions may be limited and, consequently, the change in the volume of the negative electrode may be reduced to a sufficient degree. The insulative material has a higher volume resistivity than a metal constituting the negative electrode current collector.

The protrusions may be composed entirely of an insulative material. In order to enhance the charge/discharge efficiency, only some portions of the protrusions may be composed of an insulative material and the remaining portions may be composed of a conductive material. The insulative material may be arranged to face the positive electrode. In such a case, the likelihood of lithium metal deposited on specific portions of the protrusions which face the positive electrode may be reduced and, consequently, in particular, the change in the volume of the negative electrode current collector in the thickness direction may be readily limited.

The insulative material may be arranged to cover at least a part of the surfaces of the conductive material. In such a case, lithium metal is more likely to be deposited in the spaces created in the vicinity of the protrusions than on the surfaces of the protrusions and, consequently, the change in the volume of the negative electrode may be further readily limited.

Specifically, the insulative material may be arranged to cover a surface of the conductive material which faces the positive electrode. A conductive material may be disposed between the first surface and the insulative material. In such a case, the lithium metal deposited on the protrusions and/or in the spaces created in the vicinity of the protrusions may be readily dissolved with the conductive material during discharge and, consequently, the charge/discharge efficiency of the battery may be enhanced. Furthermore, the cycle life of the battery may be increased.

The protrusions protrude from the first surface toward a surface of the separator which faces the first surface. At least one of the protrusions may be arranged to come into contact with the separator. Specifically, 80% or more of the total area of the protrusions may be arranged to come into contact with the separator. In another case, all of the protrusions may be arranged to come into contact with the separator. In the case where protrusions that include the insulative material are in contact with the separator, for example, the insulative material comes into contact with the separator. In such a case, the likelihood of lithium metal deposited between the protrusions and the separator may be readily reduced and, consequently, the partial expansion of the negative electrode current collector may be readily limited.

The term "the total area of protrusions" used herein refers to the total area of the figure formed by projecting the protrusions onto the first surface in the thickness direction of the negative electrode current collector. The total area of the protrusions may be determined before the negative electrode current collector is formed into an electrode group. Alternatively, the total area of the protrusions and the area of portions of the protrusions which come into contact with the separator may be determined partially after the negative electrode current collector has been removed from the electrode group. In such a case, for example, the total area of some of the protrusions which are included in a predetermined region of the first surface and the area of portions of the specific protrusions which come into contact with the separator are determined. The above area ratio may be determined on the basis of these areas.

The term "projection of protrusions on the first surface" used herein refers to a figure formed by projecting the protrusions onto the first surface in the thickness direction of the negative electrode current collector.

The insulative material has a volume resistivity of, for example, $10^5$ Ω·cm or more. In order to reduce the deposition of lithium metal with effect, the volume resistivity of the insulative material may be $10^6$ Ω·cm or more or may be $10^8$ Ω·cm or more, which is commonly considered as a high-resistance range.

In the case where the negative electrode current collector has a first edge and a second edge opposite to the first edge, the first surface includes at least one first region that has a band-like shape and that connects the first edge to the second edge. None of the protrusions is disposed in the at least one first region. Providing the first region in which none of the protrusions is disposed enables the nonaqueous electrolyte to move on the first surface uniformly. In the case where the electrode group is wound, the nonaqueous electrolyte may readily penetrate deep into the inside of the electrode group through the first region. This enables the charge/discharge reaction to occur over the entirety of the electrode group and makes it easy to achieve a high battery capacity. In particular, in the case where the negative electrode current collector has a rectangular shape with two long sides and two short sides, the first region may be formed in a first direction that connects one of the short sides, that is, a first edge, to the other short side, that is, a second edge. The first direction may be a direction that extends in the longitudinal direction of the negative electrode current collector. The number of the first regions may be one or more.

It is considered that the first region is disposed in the first surface when a virtual line (specifically, a straight line, a curve, or a combination of a straight line and a curve) that connects a point located on the first edge to a point located on the second edge without passing through any of the protrusions can be drawn in the first surface. The first region may have a certain width (i.e., a length in a direction that intersects the first direction) in order to facilitate the movement of the nonaqueous electrolyte.

The first direction is the direction of a straight line that passes through a point located on the first edge of the negative electrode current collector and a point located on the second edge of the negative electrode current collector. The longitudinal direction of the negative electrode current collector is the direction of a straight line that passes through the midpoints of the two short sides of the negative electrode current collector. The expression "the first direction extends in the longitudinal direction" used herein means that the acute angle formed by the first direction and the longitudinal direction is 30° or less.

The protrusions may be arranged on the first surface at certain distances. For example, in the case where the protrusions are line-like, the minimum clearance between adjacent two of the protrusions may be larger than the minimum width of the two adjacent protrusions. In such a case, spaces having a volume adequate to accommodate the deposited lithium metal may be readily created.

The minimum clearance between adjacent two of the protrusions is not limited and may be 150% or more, 400% or more, or 500% or more of the minimum width of the two adjacent protrusions. The minimum clearance between adjacent two of the protrusions may be 3000% or less of the minimum width of the two adjacent protrusions.

The term "minimum clearance between two adjacent protrusions" used herein refers to the minimum distance between an outer edge of one of the two adjacent protrusions and an outer edge of the other protrusion which is measured in a figure formed by projecting the protrusions onto the first surface in the thickness direction of the negative electrode current collector. The term "the minimum width of two adjacent protrusions" used herein refers to the minimum width of the two protrusions which is measured in the projection of the two adjacent protrusions on the first surface.

The line-like protrusions may be protrusions that connect two opposite outer edges of the negative electrode current collector to each other (hereinafter, such protrusions are referred to as "stripe-like protrusions") or may be protrusions that do not connect two opposite outer edges of the negative electrode current collector to each other (hereinafter, such protrusions are referred to as "long-rectangular protrusions"). The line-like shape may consist of a straight line, a curve, or a combination of a straight line and a curve.

The ratio of the total area of the protrusions to the area of the first surface may be 0.2% or more and 70% or less. The area ratio of the protrusions may be 1% or more or 3% or more. When the area ratio of the protrusions falls within the above range, the separator may be readily supported by the protrusions and the distance between the first surface and the separator may be readily maintained consistent. As a result, the expansion of the negative electrode may be further reduced. The area ratio of the protrusions may be 50% or less. When the area ratio of the protrusions falls within the above range, the spaces may be readily created between the first surface and the separator. As a result, it may become possible to achieve a further high discharge capacity while reducing the expansion of the negative electrode which is caused by the deposition of lithium metal. The above lower and upper limits may be combined with each other appropriately. The area of the first surface may be calculated before the negative electrode current collector is formed into an electrode group or after the negative electrode current collector has been removed from the electrode group.

Regions of the surfaces of the negative electrode current collector which do not face the positive electrode active material are not taken into account in the calculation of the area ratio of the protrusions. That is, the first surface does not include the region of the surface of the negative electrode current collector which does not face the positive electrode active material. Similarly, the second surface described below does not include the region of the surface of the negative electrode current collector which does not face the positive electrode active material. Thus, the regions that do not face the positive electrode active material are not taken into account in the calculation of the area of the first surface, the area of the second surface, and the area of the protrusions.

For example, when the electrode group is wound, the outer surface of a portion of the negative electrode current collector which acts as the outermost layer of the wound electrode group does not always face the positive electrode active material. In such a case, the outer surface of the portion of the negative electrode current collector which does not face the positive electrode active material is not taken into account in the calculation of the area of the first or second surface and the surface of the protrusions, because lithium metal is less likely to be deposited on the outer surface of the portion of the negative electrode current collector. Furthermore, the inner surface of a portion of the negative electrode current collector which acts as the innermost layer of the wound electrode group does not always face the positive electrode active material. In such a case, the inner surface of the portion of the negative electrode current collector which does not face the positive electrode active material is not taken into account in the calculation of the area of the first or second surface and the surface of the protrusions, because lithium metal is less likely to be deposited on the inner surface of the portion of the negative electrode current collector. In the case where the width of the negative electrode current collector in a direction parallel to the winding axis is larger than the width of the positive electrode current collector, band-like regions of the surfaces of the negative electrode current collector which extend in the longitudinal direction of the negative electrode current collector, which is perpendicular to the winding axis, do not face the positive electrode active material at the upper and/or lower end of the electrode group (i.e., at one or both ends of the electrode group in a direction parallel to the winding axis). In such a case, the band-like regions are not taken into account in the area calculation.

The heights of the protrusions may be determined in accordance with the amount of lithium metal that is deposited on the first surface. The average height of the protrusions above the first surface (hereinafter, this average height is referred to as "first average height") may be set to 15 μm or more and 120 μm or less. The first average height may be set to 20 μm or more or 30 μm or more. The first average height may be set to 40 μm or more or 50 μm or more. When the first average height falls within the above range, the change in the volume of the negative electrode which is caused by the deposition of lithium metal may be reduced in a further effective manner. Furthermore, the electrodes may be protected in a further effective manner. The first average height may be set to 110 μm or less, 100 μm or less, or 90 μm or less. When the first average height falls within the above range, the lithium metal deposited on the first surface may be pressed by the separator at an adequate pressure and, consequently, the conductivity between the lithium metal and the negative electrode current collector may be increased. As a result, the charge/discharge efficiency may be increased. Moreover, the likelihood of the separator pressing the protrusions at an excessively high pressure may be reduced and, consequently, the electrodes may be protected. The above lower and upper limits may be combined with each other appropriately.

The first average height may be determined by, for example, selecting ten random protrusions in a cross-sectional image of the negative electrode current collector taken in the thickness direction, measuring the distance between the first surface and the edge of each of the protrusions as the height of the protrusion, and averaging the heights of the ten protrusions. The first average height may alternatively be determined by taking a piece of the negative electrode current collector having a certain area (e.g., 5 cm$^2$) in the first surface or pieces of the negative electrode current collector and averaging the heights of random protrusions selected from the piece having a certain area or the pieces. In such a case, the first average height may be determined by taking cross-sectional images of the pieces having a certain area or the pieces, measuring the distance between the first surface and the edge of each of the protrusions as the height of the protrusion on the basis of the cross-sectional images, and averaging the heights of the protrusions. The protrusions that are to be measured may be arranged over the entirety of the first surface or only a part of the first surface.

In the case where the edges of the protrusions are not flat, the maximum height of each of the protrusions above the first surface is considered as the height of the protrusion. The average height of the protrusions may be measured on the basis of a cross-sectional image of the electrode group which covers a cross section of the negative electrode current collector taken in the thickness direction. In the case where the first surface is rough, the surface roughness Rz of the first surface may be 1μm or less. The heights of the protrusions may exceed 1 μm. In the case where the electrodes are wound, the heights of the protrusions are measured after the electrode group has been unwound and spread such that the first surface becomes flat. In the case where the first surface is rough, the heights of the protrusions are measured with respect to the top of the irregularities.

The structure of the lithium secondary battery according to the embodiment is specifically described below. First, the structure of the negative electrode is described with reference to the attached drawings. Hereinafter, the same or similar elements are denoted by the same reference numeral and the duplicate description thereof may be omitted.

Negative Electrode

The negative electrode includes a negative electrode current collector. The negative electrode current collector includes a layer having a first surface. The negative electrode current collector also includes protrusions protruding from the first surface. While the lithium secondary battery is charged, lithium metal is deposited on the first surface. Specifically, while the lithium secondary battery is charged, lithium ions contained in a nonaqueous electrolyte receive electrons on the negative electrode current collector to form lithium metal, which is deposited on the surface of the negative electrode current collector. While the lithium secondary battery is discharged, the lithium metal deposited on the surface of the negative electrode current collector dissolves in the nonaqueous electrolyte to form lithium ions. The lithium ions contained in the nonaqueous electrolyte may be lithium ions derived from a lithium salt included in the nonaqueous electrolyte or lithium ions fed from the positive electrode active material while the lithium secondary battery is charged. In another case, the nonaqueous electrolyte may include both of the above types of lithium ions.

Since the negative electrode current collector includes protrusions formed on the first surface, spaces capable of accommodating the deposited lithium metal may be readily created in the vicinity of the first surface. The spaces may reduce the expansion of the negative electrode which may be caused by the deposition of lithium metal.

FIG. 1 is a schematic cross-sectional view of a negative electrode current collector according to an embodiment of the present disclosure. A negative electrode current collector 34 according to this embodiment includes a conductive sheet (i.e., an example of the layer) 342 having a first surface S1 and a second surface S2 opposite to the first surface S1, and protrusions protruding from the first surface S1. Lithium metal is deposited on the first surface during charge. Among the protrusions, at least one protrusion 341 includes an insulative material 341a. In the example illustrated in FIG. 1, the protrusion 341 includes two adjacent protrusions 341. The minimum clearance between the two adjacent protrusions 341 is P. The minimum width of the two adjacent protrusions 341 is D.

As illustrated in FIG. 1, the entirety of each of the protrusions 341 may be composed of the insulative material 341a. That is, each of the protrusions 341 may be composed entirely of the insulative material. In order to enhance the charge/discharge efficiency, only a portion of each of the protrusions 341 may be composed of the insulative material 341a and the remaining portion may be composed of a conductive material 341b (see FIGS. 2 and 3). The insulative material 341a may be arranged such that at least a portion of the insulative material 341a faces the positive electrode. In such a case, the likelihood of lithium metal deposited on specific portions of the protrusions 341 which face the positive electrode may be reduced and, consequently, in particular, the change in the volume of the negative electrode current collector 34 in the thickness direction may be readily limited. When the protrusions 341 are in contact with the separator, the insulative material 341a included in each of the protrusions 341 comes into contact with the separator.

Figure 2:
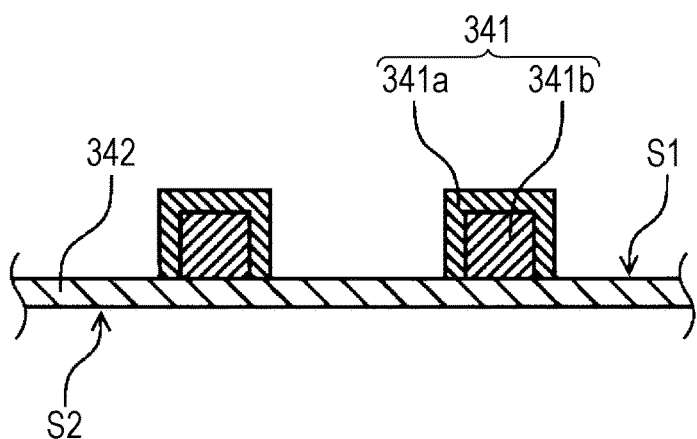
FIG. 2 is a schematic cross-sectional view of a negative electrode current collector according to another embodiment of the present disclosure.

FIG. 2 is a schematic cross-sectional view of a negative electrode current collector according to another embodiment of the present disclosure. Similarly to the example illustrated in FIG. 1, a negative electrode current collector 34 according to this embodiment includes a conductive sheet 342 including the first and second surfaces S1 and S2 and protrusions protruding from the first surface S1. Among the protrusions, at least one protrusion 341 includes an insulative material 341a and a conductive material 341b. The insulative material 341a covers at least a part of the surfaces of the conductive material 341b. As illustrated in FIG. 2, the insulative material 341a may be arranged to cover the entire surfaces of the conductive material 341b except the surface acting as an interface between the conductive material 341b and the first surface S1. In such a case, lithium metal is more likely to be deposited in the spaces created by the protrusions 341 than on the surfaces of the protrusions 341 and, consequently, the change in the volume of the negative electrode current collector 34 may be further readily limited. Note that, the term "the surfaces of a protrusion 341" used herein refers to the surfaces of the protrusion 341 except the surface acting as an interface between the protrusion 341 and the first surface S1.

Figure 3:
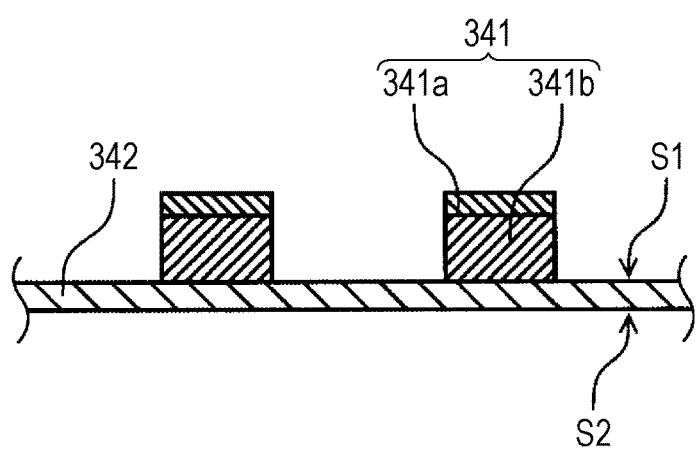
FIG. 3 is a schematic cross-sectional view of a negative electrode current collector according to still another embodiment of the present disclosure.

FIG. 3 is a schematic cross-sectional view of a negative electrode current collector according to still another embodiment of the present disclosure. Similarly to the examples illustrated in FIGS. 1 and 2, a negative electrode current collector 34 according to this embodiment includes a conductive sheet 342 including the first and second surfaces S1 and S2 and protrusions protruding from the first surface S1. Among the protrusions, at least one protrusion 341 includes an insulative material 341a and a conductive material 341b. The insulative material 341a covers at least a part of the surfaces of the conductive material 341b. As illustrated in FIG. 3, the insulative material 341a may be disposed on a surface of the conductive material 341b which faces the positive electrode. In such a case, the lithium metal deposited on the protrusions 341 and/or in the spaces created in the vicinity of the protrusions 341 may readily dissolve during discharge and, consequently, the charge/discharge efficiency of the battery may be enhanced. Furthermore, the cycle life of the battery may be increased.

The constituents of the insulative material are not limited. The insulative material may include, for example, at least one material selected from the group consisting of fluororesins, such as polytetrafluoroethylene (PTFE) and polyvinylidene fluoride (PVdF); rubber resins, such as polyacrylonitrile (PAN), a polyimide resin, an acrylic resin, a polyolefin resin, a urethane resin, a polycarbonate resin, an epoxy resin, and a styrene butadiene copolymer (SBR); and cellulose resins, such as carboxymethyl cellulose. The insulative material may include a resin material produced by curing a curable resin, such as an epoxy resin. Among the above materials, polyimide is desirable because it is chemically stable in a nonaqueous electrolyte and easy to work. The insulative material may include a nonconductive inorganic filler. Examples of the nonconductive inorganic filler include metal oxides, such as alumina, magnesia, and silica; borate salts, such as lithium borate; phosphate salts, such as lithium phosphate; and inorganic compounds, such as a carbide, a nitride, a boride, a hydroxide, a carbonate salt, a sulfate salt, and a nitrate salt. The insulative material may include a conductive inorganic filler such that the insulating property is not impaired. Examples of the conductive inorganic filler include metal materials, such as copper and silver; carbon materials, such as carbon black and carbon nanotubes; and particular metal carbides, particular metal nitrides, and particular metal borides.

The method for forming the protrusions composed entirely of an insulative material is not limited. For example, a tape-like insulative material that includes an adhesive (e.g., a silicone resin or an acrylic resin) may be cut into strips having a desired shape, and the strips may be put onto the first surface. Alternatively, a sheet-like or line-like (e.g., filamentous) insulative material may be cut into strips having a desired shape, and the strips may be joined onto the first surface by thermal fusion bonding. In another case, a precursor of an insulative material may be applied onto the first surface in a desired pattern, and polymerization, cross-linking, or re-crosslinking may be subsequently performed by a heat treatment or the like. In the case where polyimide is used as an insulative material, for example, a polyamic acid solution, which is a precursor of polyimide, may be applied onto the first surface, and a heat treatment may be subsequently performed in order to induce imidization. The protrusions may be formed by applying a solution or dispersion that contains an insulative material onto the first surface and drying the resulting coating films. The protrusions may be formed by applying a curable resin onto the first surface in a desired pattern and curing the resulting coating film.

The protrusions including a conductive material and an insulative material that covers a part or the entirety of the surfaces of the conductive material may be composed of a composite material of a conductive material and an insulative material. Such protrusions may be formed by, for example, depositing the insulative material on a part or the entirety of the surfaces of bumps composed of the conductive material. It is desirable that the interface between the conductive material and the first surface be not covered with the insulative material. The method for covering the conductive material with the insulative material is not limited. For example, a mask may be disposed on a part or the entirety of the surfaces of the conductive material as needed before the deposition of the insulative material. The method for depositing the insulative material on the conductive material is not limited; a physical method, such as coating, a chemical method, such as an oxidation reaction, an electrochemical method, such as electrodeposition, and a gas-phase method, such as vapor deposition, may be used.

The conductive material may be formed by, for example, applying a paste that includes the conductive material onto the first surface in a desired pattern and drying the resulting coating film by a heat treatment. Alternatively, the conductive material may be formed by cutting a foil-like or line-like conductive material into strips having a desired shape and joining the strips onto the first surface by welding (e.g., ultrasonic welding or electric resistance welding). In another case, the conductive material and a layer such as the conductive sheet may be formed in one piece using the same material. The conductive material may be formed by etching the surface of the negative electrode current collector. Another conductive material may be deposited on the bumps formed by etching. The conductive material may be selected appropriately from the examples of the material for the conductive sheet. The conductive material may serve as a portion of the negative electrode current collector.

The projection of each of the protrusions on the first surface is not limited. The projection of each protrusion may be, for example, line-like as described above or spot-like. The projection of each of the protrusions on the first surface may be line-like in order to make it easy to hold the separator and reduce the likelihood of the nonaqueous electrolyte being distributed unevenly on the first surface.

The term "spot-like" used herein refers to the shape of a protrusion such that the ratio of the long side LL of a smallest rectangle that surrounds the projection of the protrusion to the short side SL of the rectangle (LL/SL) is less than 2 or the rectangle is square. Specific examples of the spot-like shape include, but are not limited to, a circular shape, an elliptical shape, and a polygonal shape.

The term "line-like" used herein refers to the shape of a protrusion such that the ratio of the long side LL of a smallest rectangle that surrounds the projection of the protrusion to the short side SL of the rectangle (LL/SL) is 2 or more. The line-like protrusions may be protrusions that connect two opposite outer edges of the negative electrode current collector to each other (hereinafter, such protrusions are referred to as "stripe-like protrusions") or may be protrusions that do not connect two opposite outer edges of the negative electrode current collector to each other (hereinafter, such protrusions are referred to as "long-rectangular protrusions"). The line-like shape may consist of a straight line, a curve, or a combination of a straight line and a curve.

Line-like protrusions may be arranged substantially parallel to one another. In such a case, it becomes easy to hold the separator and create a space having an adequate volume between each two adjacent protrusions. The expression "line-like protrusions are arranged substantially parallel to one another" used herein means that the longitudinal directions of the protrusions are parallel to one another or the longitudinal directions of the protrusions form an acute angle of 30° or less with one another. The term "the longitudinal direction of a protrusion" used herein refers to the direction of a straight line that passes through the centers of opposite two short sides of a minimum rectangle that surrounds the projection of the protrusion.

The line-like protrusions may be arranged in different directions that intersect one another. The expression "line-like protrusions are arranged in different directions that intersect one another" used herein means that the acute angles formed by the longitudinal directions of the protrusions are larger than 30°. In the case where the protrusions include a line-like protrusion A and a line-like protrusion B, the protrusions A and B may intersect each other on the first surface. Alternatively, a virtual protrusion A formed by extending the protrusion A in the longitudinal direction of the protrusion A may intersect a virtual protrusion B formed by extending the protrusion B in the longitudinal direction of the protrusion B on the first surface. The virtual protrusions A and B may intersect outside the first surface. In another case, the protrusion A may intersect the virtual protrusion B on the first surface.

The size of the protrusions is not limited. For example, the size of each of the protrusions may be determined such that the ratio of the total area of the protrusions to the area of the first surface is 0.2% or more and 70% or less. The minimum width of the line-like protrusions is, for example, 0.1 mm or more and 10 mm or less.

The protrusions are, for example, not frame-like protrusions that surround the entirety or a part of the surface of the first surface. The first surface may include a band-like region in which none of the protrusions is disposed. In such a case, the likelihood of the deposited lithium metal coming into contact with the separator may be increased. Consequently, the uneven deposition of lithium metal included in the nonaqueous electrolyte may be reduced in a further effective manner and the formation of the dendrites may be limited accordingly. In addition, the likelihood of the protrusions blocking the movement of the nonaqueous electrolyte may be reduced. As a result, the uneven distribution of the nonaqueous electrolyte may be limited. This facilitates the deposition and dissolution of lithium metal.

Figure 4:
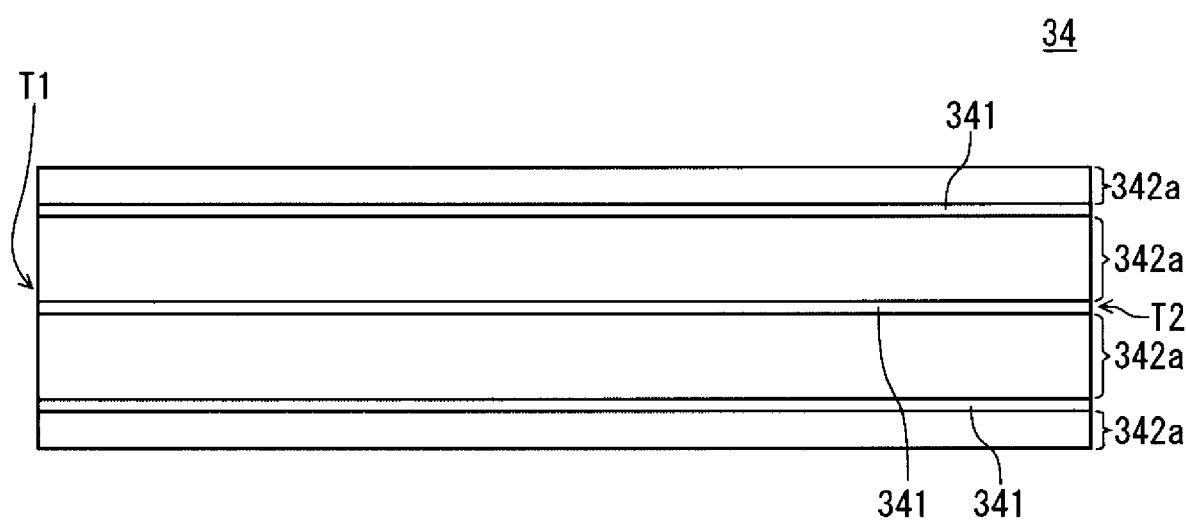
FIG. 4 is a schematic top plan view of a negative electrode current collector according to an embodiment of the present disclosure.

FIG. 4 is a schematic top plan view of a negative electrode current collector according to an embodiment of the present disclosure. A negative electrode current collector 34 according to this embodiment includes a conductive sheet and protrusions 341 protruding from the first surface of the conductive sheet. The protrusions 341 may be the protrusions 341 described in any one of the above-described embodiments. In the case where the negative electrode current collector 34 has a first edge T1 and a second edge T2 opposite to the first edge T1 as illustrated in FIG. 4, the band-like region may be formed in a first direction that connects the first edge T1 to the second edge T2. In other words, the first surface may include at least one first region (i.e., an example of the band-like region) 342a in which none of the protrusions 341 is disposed. The first region 342a is likely to be formed in the case where the projection of each of the protrusions 341 is line-like (in particular, stripe-like).

A region having a shape other than the band-like shape in which none of the protrusions 341 is disposed may be optionally formed on the first surface. For example, a negative electrode lead electrically connected to the negative electrode is connected to this region by welding or the like.

The negative electrode current collector may optionally include protrusions protruding from a second surface opposite to the first surface in addition to the protrusions protruding from the first surface. When viewed in plan, a figure formed by projecting the protrusions disposed on the first surface onto the first surface may overlap a figure formed by projecting the protrusions disposed on the second surface onto the second surface. The projection of the protrusions disposed on the first surface may partly or completely overlap the projection of the protrusions disposed on the second surface.

The negative electrode current collector includes a conductive sheet and the protrusions. Examples of the conductive sheet include a foil and a film.

The conductive sheet may have a flat and smooth surface. In such a case, the lithium metal derived from the positive electrode is likely to be deposited uniformly on the surface of the conductive sheet during charge. The expression "flat and smooth" used herein means that the maximum roughness height Rz of the surface of the conductive sheet is 20 μm or less. The maximum roughness height Rz of the surface of the conductive sheet may be 10 μm or less. Measurement of maximum roughness height Rz is conducted in accordance with JIS B 0601:2013.

The conductive sheet is composed of, for example, a conductive material other than lithium metal or a lithium alloy. The conductive material may be a metal material, such as a metal or an alloy. The conductive material may be a material that does not react with lithium. Examples of such a material include materials that do not react with lithium metal and/or a lithium ion. Specific examples thereof include a material that does not react with lithium to form an alloy or an intermetallic compound. Examples of such a conductive material include copper (Cu), nickel (Ni), iron (Fe), alloys of these metal elements, and graphite the basal plane of which is preferentially exposed. Examples of the alloy include a copper alloy and stainless steel (SUS). Copper and/or a copper alloy, which has a high conductivity, may be used as a conductive material in order to readily achieve a large battery capacity and a high charge/discharge efficiency. The conductive sheet may include one or more of the above conductive materials.

The thickness of the conductive sheet is not limited and may be, for example, 5μm or more and 300 μm or less.

A negative electrode mixture layer (not illustrated) may optionally be formed on the surfaces of the conductive sheet. In such a case, the negative electrode mixture and the conductive sheet correspond to an example of the layer. The negative electrode mixture layer may include lithium metal. The negative electrode mixture layer may be disposed over the entire surfaces of the conductive sheet. The negative electrode mixture layer may be formed by, for example, depositing lithium metal on a part or the entirety of the surfaces of the conductive sheet by electrodeposition, vapor deposition, or the like. The negative electrode mixture layer may alternatively be formed by, for example, applying a paste containing a negative electrode active material, such as graphite, onto a part or the entirety of the surfaces of the conductive sheet. The order in which the negative electrode mixture layer and the protrusions are formed is not limited. The protrusions may be formed subsequent to the formation of the negative electrode mixture layer. The negative electrode mixture layer may be formed subsequent to the formation of the protrusions. Note that the negative electrode mixture layer is formed so as not to cover the entire surfaces of the protrusions. The thickness of the negative electrode mixture layer is not limited and may be, for example, 30 to 300 μm. The negative electrode mixture layer may include the first surface. The negative electrode mixture layer may further include the second surface.

Positive Electrode

The positive electrode includes, for example, a positive electrode current collector and a positive electrode mixture layer disposed on the positive electrode current collector. The positive electrode mixture layer includes, for example, a positive electrode active material, a conductant agent, and a binder. The positive electrode mixture layer may be disposed on both surfaces of the positive electrode current collector. The positive electrode may be produced by, for example, applying a positive electrode mixture slurry that includes the positive electrode active material, the conductant agent, and the binder on both surfaces of the positive electrode current collector, drying the resulting coating films, and then performing rolling.

The positive electrode active material is capable of occluding and releasing lithium ions. Examples of the positive electrode active material include a lithium transition metal oxide, a transition metal fluoride, a polyanion, a fluorinated polyanion, and a transition metal sulfide. The positive electrode active material may be a lithium transition metal oxide, which is produced at low cost and offers a high average discharge voltage.

Examples of a transition metal element included in the lithium transition metal oxide include Sc, Ti, V, Cr, Mn, Fe, Co, Ni, Cu, Y, Zr, and W. The lithium transition metal oxide may include one or more transition metal elements. The transition metal element may be at least one element selected from the group consisting of Co, Ni, and Mn. The lithium transition metal oxide may optionally include one or more typical metal elements. Examples of the typical metal elements include Mg, Al, Ca, Zn, Ga, Ge, Sn, Sb, Pb, and Bi. The typical metal elements may be Al and the like.

Examples of the conductant agent include a carbon material. Examples of the carbon material include carbon black, acetylene black, KETJENBLACK, carbon nanotubes, and graphite. The positive electrode mixture layer may include one or more conductant agents.

Examples of the binder include a fluororesin, polyacrylonitrile, a polyimide resin, an acrylic resin, a polyolefin resin, and a rubber-like polymer. Examples of the fluororesin include polytetrafluoroethylene and polyvinylidene fluoride. The positive electrode mixture layer 31 may include one or more binders.

The positive electrode current collector may be composed of a metal material including, for example, Al, Ti, or Fe. Examples of such a metal material include Al, an Al alloy, Ti, a Ti alloy, and an Fe alloy. The Fe alloy may be SUS.

The positive electrode current collector may be, for example, a porous or nonporous sheet. Examples of a sheet of a metal material include a metal foil (i.e., a metal film) and a metal mesh. The carbon material described above as an example of the conductant agent may optionally be applied onto the surfaces of the positive electrode current collector. In such a case, for example, the resistance may be reduced. Moreover, catalytic effects may be achieved. In addition, the bond between the positive electrode mixture layer and the positive electrode current collector may be strengthened.

Separator

The separator is a porous sheet having ionic permeability and an insulating property. Examples of the porous sheet include a thin-film, a woven fabric, and a nonwoven fabric that have micropores formed therein. The separator may be composed of any material. The separator may be composed of a high-molecular material. Examples of the high-molecular material include an olefin resin, a polyamide resin, and cellulose. Examples of the olefin resin include polyethylene, polypropylene, and a copolymer of ethylene with propylene. The separator may optionally include an additive. Examples of the additive include an inorganic filler.

The separator may include layers having different structures and/or compositions. Examples of such a separator include a multilayer body constituted by a microporous polyethylene film and a microporous polypropylene film stacked on top of each other; and a multilayer body constituted by a nonwoven fabric including cellulose fibers and a nonwoven fabric including thermoplastic resin fibers which are stacked on top of each other. The separator may be produced by forming a polyamide resin film on the surface of a microporous film, a woven fabric, a nonwoven fabric, or the like. The above separators have high durability even when pressurized while being in contact with the protrusions. In order to enhance heat resistance and/or increase strength, a layer including an inorganic filler may be formed on the surface of the separator which faces the positive electrode and/or the surface of the separator which faces the negative electrode.

Nonaqueous Electrolyte

The nonaqueous electrolyte is conductive to lithium ions. The nonaqueous electrolyte includes a nonaqueous solvent and lithium ions and anions dissolved in the nonaqueous solvent. The nonaqueous electrolyte may be liquid or gelatinous. The nonaqueous electrolyte may be a solid electrolyte.

A nonaqueous liquid electrolyte may be prepared by dissolving a lithium salt in a nonaqueous solvent. While the lithium salt dissociate into lithium ions and anions when dissolved in the nonaqueous solvent, the nonaqueous electrolyte may include an undissociated lithium salt.

The gelatinous nonaqueous electrolyte may be a nonaqueous electrolyte including a lithium salt and a matrix polymer or a nonaqueous electrolyte including a lithium salt, a nonaqueous solvent, and a matrix polymer. The matrix polymer is, for example, a polymer material that gelatinizes upon absorbing the nonaqueous solvent. The polymer material may be at least one material selected from the group consisting of a fluororesin, an acrylic resin, and a polyether resin.

The lithium salt and the anions may be selected from known lithium salts and anions included in nonaqueous electrolytes for lithium secondary batteries. Examples of the anions include $BF_4^-$, $ClO_4^-$, $PF_6^-$, $CF_3SO_3^-$, $CF_3CO_2^-$, anions of imides, and anions of oxalates. Examples of the imide anion include $N(SO_2CF_3)_2^-$ and $N(C_mF_{2m+1}SO_2)_x(C_nF_{2n+1}SO_2)_y^-$, where m and n each independently represent an integer of 0 or more, x and y each independently represent 0, 1, or 2, and x+y=2. The oxalate complex anion may include boron and/or phosphorus. Examples of the oxalate complex anion include a bisoxalatoborate anion, $BF_2(C_2O_4)^-$, $PF_4(C_2O_4)^-$, and $PF_2(C_2O_4)_2^-$. The nonaqueous electrolyte may include one or more anions selected from the above anions.

In order to reduce the dendritic deposition of lithium metal, the nonaqueous electrolyte may include at least one anion selected from the group consisting of $PF_6^-$, anions of imides, and anions of oxalates. The imide anion may be $N(SO_2CF_3)_2^-$, $N(SO_2C_2F_5)_2^-$, or $N(SO_2F)_2^-$. In particular, when the nonaqueous electrolyte includes an oxalate complex anion, lithium metal is likely to be uniformly deposited in the form of fine particles, as a result of an interaction between the oxalate complex anion and lithium and, consequently, the likelihood of the negative electrode nonuniformly expanding due to the partial deposition of the lithium metal may be reduced. The oxalate complex anion may be used in combination with other anions. The other anions may be $PF_6^-$ and/or anions of imides.

Examples of the nonaqueous solvent include an ester, an ether, a nitrile, an amide, and halogenated derivatives thereof. The nonaqueous electrolyte may include one or more nonaqueous solvents selected from the above nonaqueous solvents. Examples of the halogenated derivatives include a fluoride.

Examples of the ester include a carbonate ester and a carboxylate ester. Examples of a cyclic carbonate ester include ethylene carbonate, propylene carbonate, and fluoroethylene carbonate (FEC). Examples of a chain carbonate ester include dimethyl carbonate (DMC), ethyl methyl carbonate (EMC), and diethyl carbonate. Examples of a cyclic carboxylate ester include γ-butyrolactone and γ-valerolactone. Examples of a chain carboxylate ester include ethyl acetate, methyl propionate, and methyl fluoropropionate.

Examples of the ether include a cyclic ether and a chain ether. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The concentration of the lithium salt in the nonaqueous electrolyte is, for example, 0.5 mol/L or more and 3.5 mol/L or less. Note that, the lithium salt concentration is the sum of the concentration of dissociated lithium salt and the concentration of undissociated lithium salt. The anion concentration in the nonaqueous electrolyte may be 0.5 mol/L or more and 3.5 mol/L or less.

The nonaqueous electrolyte may include an additive. The additive may form a coating film on the negative electrode. Forming a coating film derived from the additive on the negative electrode may further reduce the formation of the dendrites. Examples of such an additive include vinylene carbonate, FEC, and vinyl ethyl carbonate (VEC). The above additives may be used alone or in combination of two or more.

Lithium Secondary Battery

A lithium secondary battery according to the present disclosure is described below with reference to the attached drawings, in which a cylindrical battery including a wound electrode group is illustrated as an example. However, the present disclosure is not limited by the lithium secondary battery described below.

Figure 5:
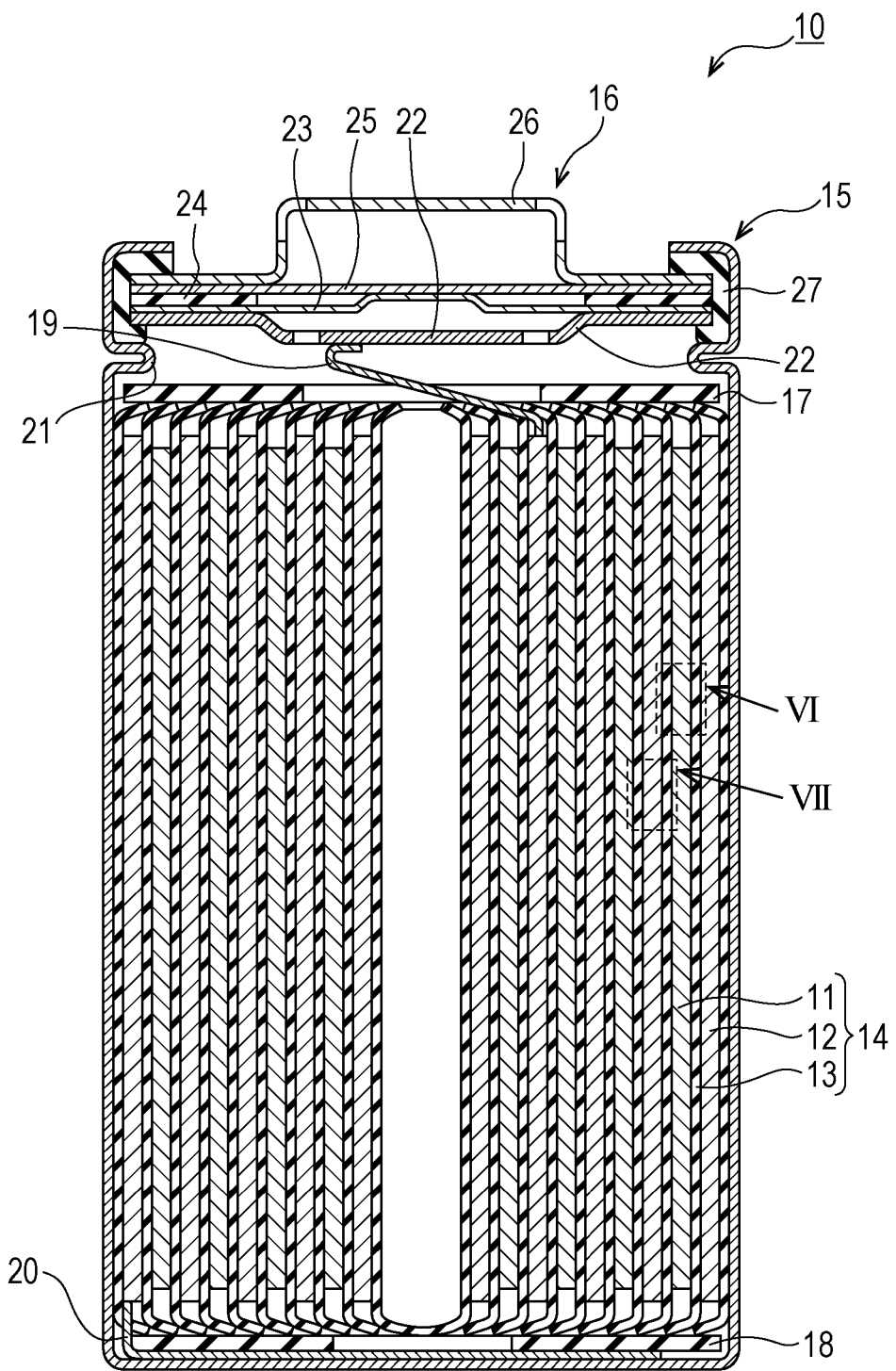
FIG. 5 is a schematic longitudinal cross-sectional view of a lithium secondary battery according to an embodiment of the present disclosure.
Figure 6:
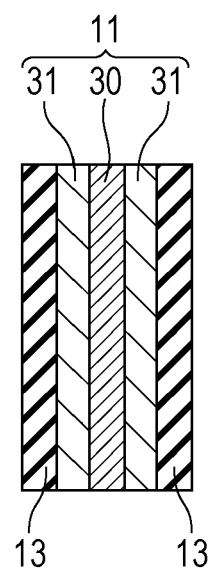
FIG. 6 is a schematic cross-sectional view of a positive electrode according to an embodiment of the present disclosure.
Figure 7:
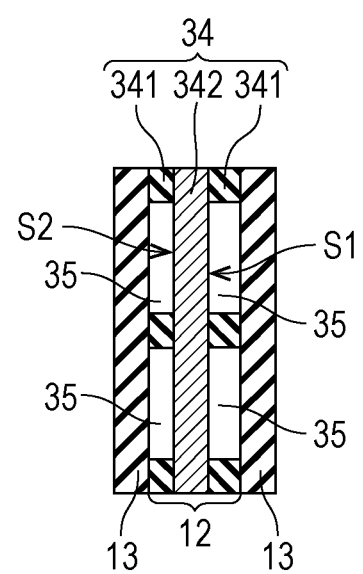
FIG. 7 is a schematic cross-sectional view of a negative electrode according to an embodiment of the present disclosure.

FIG. 5 is a longitudinal cross-sectional view of a lithium secondary battery 10, which is an example of the lithium secondary battery according to this embodiment. FIG. 6 is a schematic cross-sectional view of a positive electrode, which is an example of the positive electrode according to this embodiment. FIG. 7 is a schematic cross-sectional view of a negative electrode, which is an example of the negative electrode according to this embodiment. In the lithium secondary battery 10, lithium metal is deposited on a negative electrode 12 during charge and the lithium metal dissolves in a nonaqueous electrolyte (not illustrated) during discharge.

The lithium secondary battery 10 is a cylindrical battery that includes a cylindrical battery casing and a wound electrode group 14 and a nonaqueous electrolyte (not illustrated) that are accommodated in the battery casing. The battery casing includes a casing main body 15, which is a cylindrical metal container with a bottom, and a sealing plate 16 with which an opening formed in the casing main body 15 is sealed. A gasket 27 is disposed between the casing main body 15 and the sealing plate 16 in order to hermetically seal the battery casing. In the casing main body 15, insulating plates 17 and 18 are disposed at the respective edges of the electrode group 14 in the direction of the axis around which the electrode group 14 is wound.

The casing main body 15 includes a step 21 formed by, for example, pressing a portion of the side wall of the casing main body 15 from the outside of the casing main body 15. The step 21 may be formed on the side wall of the casing main body 15 in a circular shape in the circumferential direction of the casing main body 15. In such a case, the sealing plate 16 is supported by the opening-side surface of the step 21.

The sealing plate 16 includes a filter 22, a lower valve plate 23, an insulating member 24, an upper valve plate 25, and a cap 26, which are stacked on top of one another in this order. The sealing plate 16 is attached to the opening of the casing main body 15 such that the cap 26 is located on the outer side of the casing main body 15 and the filter 22 is located on the inner side of the casing main body 15. The above components of the sealing plate 16 may have, for example, a disc-like shape or a ring-like shape. The lower valve plate 23 and the upper valve plate 25 are connected to each other at the centers of the valve plates. The insulating member 24 is disposed between the lower valve plate 23 and the upper valve plate 25 in the circumferences of the valve plates. The filter 22 and the lower valve plate 23 are connected to each other at the centers of the filter 22 and the lower valve plate 23. The upper valve plate 25 and the cap 26 are connected to each other at the centers of the upper valve plate 25 and the cap 26. That is, the components other than the insulating member 24 are electrically connected to one another.

The lower valve plate 23 has a vent (not illustrated) formed therein. Therefore, if the internal pressure of the battery casing is increased due to anomalous heat generation or the like, the upper valve plate 25 bows toward the cap 26 and separates from the lower valve plate 23 and, as a result, the electrical connection between the lower valve plate 23 and the upper valve plate 25 becomes interrupted. If the internal pressure of the battery casing is further increased, the upper valve plate 25 may rupture and a gas may be discharged through an opening (not illustrated) formed in the cap 26.

The electrode group 14 includes a positive electrode 11, a negative electrode 12 that includes a negative electrode current collector 34, and a separator 13. The positive electrode 11, the negative electrode 12, the negative electrode current collector 34, and the separator 13 may be the above-described positive electrode, negative electrode, negative electrode current collector, and separator. The positive electrode 11, the negative electrode 12, and the separator 13 are band-like. The positive electrode 11 and the negative electrode 12 are wound into a spiral with the separator 13 disposed between the electrodes such that the width direction of the band-like positive electrode 11 and negative electrode 12 is parallel to the axis around which the electrodes are wound. In a cross section of the electrode group 14 which is orthogonal to the winding axis, the positive electrode 11 and the negative electrode 12 are alternately stacked on top of each other in the radial direction of the wound electrode group 14 with the separator 13 disposed between the electrodes. In other words, the longitudinal direction of the electrodes is parallel to the direction in which the electrode group 14 is wound, and the width direction of the electrodes is parallel to the direction of the axis around which the electrode group 14 is wound.

The positive electrode 11 is electrically connected to the cap 26, which serves also as a positive terminal, with a positive electrode lead 19. An end of the positive electrode lead 19 is connected to, for example, a portion of the positive electrode 11 which is in the vicinity of the center of the positive electrode 11 in the longitudinal direction. The positive electrode lead 19 extends from the positive electrode 11 to the filter 22 through a through-hole (not illustrated) formed in the insulating plate 17. The other end of the positive electrode lead 19 is welded to a surface of the filter 22 which faces the electrode group 14.

The negative electrode 12 is electrically connected to the casing main body 15, which serves also as a negative terminal, with a negative electrode lead 20. An end of the negative electrode lead 20 is connected to, for example, an edge of the negative electrode 12 in the longitudinal direction. The other end of the negative electrode lead 20 is welded to the inner bottom of the casing main body 15.

The positive electrode 11 includes a positive electrode current collector 30 and a positive electrode mixture layer 31 (see FIG. 6) and is electrically connected to the cap 26, which serves as a positive terminal, with a positive electrode lead 19. An end of the positive electrode lead 19 is connected to, for example, a portion of the positive electrode 11 which is in the vicinity of the center of the positive electrode 11 in the longitudinal direction. The positive electrode lead 19 extends from the positive electrode 11 to the filter 22 through a through-hole (not illustrated) formed in the insulating plate 17. The other end of the positive electrode lead 19 is welded to a surface of the filter 22 which faces the electrode group 14.

The negative electrode 12 includes the negative electrode current collector 34 (see FIG. 7) and is electrically connected to the casing main body 15, which serves as a negative terminal, with a negative electrode lead 20. The negative electrode current collector 34 includes a conductive sheet 342 and protrusions 341. An end of the negative electrode lead 20 is connected to, for example, an edge of the negative electrode 12 in the longitudinal direction. The other end of the negative electrode lead 20 is welded to the inner bottom of the casing main body 15.

The negative electrode current collector 34 includes protrusions 341 formed on each of the first surface S1 and the second surface S2. A space that is created at a location between each two of the protrusions 341 adjacent to each other and between the first surface S1 and the separator 13 or between the second surface S2 and the separator 13 forms a space 35. In the lithium secondary battery 10, lithium metal is deposited in the spaces 35 during charge and the lithium metal dissolves in the nonaqueous electrolyte during discharge. Since the spaces 35 are capable of accommodating the deposited lithium metal, the change in the apparent volume of the negative electrode 12 which is caused by the deposition of lithium metal may be reduced and, consequently, the expansion of the negative electrode may be reduced. Furthermore, in the electrode group 14, a pressure is applied to the lithium metal accommodated in the spaces 35 and, as a result, detachment of the lithium metal may be reduced. This may limit a reduction in charge/discharge efficiency.

The apparent volume of the negative electrode 12 is the sum of the volume of the negative electrode 12, the volume of the deposited lithium metal, and the total volume of the spaces created by the protrusions 341.

Others

Although a cylindrical lithium secondary battery that includes a wound electrode group is described above as an example with reference to the drawings, the lithium secondary battery according to the above-described embodiment is not limited to this. The shape of the lithium secondary battery may be selected from, for example, a cylindrical shape, a coin-like shape, a rectangular shape, a sheet-like shape, and a flat shape appropriately in accordance with the application and the like. The structure of the electrode group is not limited and may be multilayer. The components of the lithium secondary battery which are other than the electrode group or the nonaqueous electrolyte are not limited and may be selected from known components of lithium secondary batteries.

EXAMPLES

The lithium secondary battery according to the present disclosure is specifically described below on the basis of Examples and Comparative examples. The present disclosure is not limited by Examples below.

Reference Example 1

(1) Preparation of Positive Electrode

A lithium transition metal oxide containing Li, Ni, Co, and Al (NCA) which served as a positive electrode active material, acetylene black (AB) which served as a conductant agent, and polyvinylidene fluoride (PVdF) which served as a binder were mixed at a mass ratio of NCA:AB:PVdF=95:2.5:2.5. An appropriate amount of N-methyl-2-pyrrolidone (NMP) was added to the resulting mixture. The mixture was stirred to form a positive electrode mixture slurry. The positive electrode mixture slurry was applied onto both surfaces of an Al foil used as a positive electrode current collector. The resulting coating films of the positive electrode mixture were dried and then rolled with a roller. The resulting multilayer body including the positive electrode current collector and the positive electrode mixture was cut into a predetermined electrode size. Hereby, a positive electrode that included a positive electrode current collector and positive electrode mixture layers disposed on both surfaces thereof was prepared.

(2) Preparation of Negative Electrode

Stripe-like insulative protrusions (average height: 51 μm, minimum width D: about 1 mm) as illustrated in FIG. 4 were formed on the first surface of a rectangular electrolytic copper foil (thickness: 10 μm) so as to be parallel to one another by ejecting an ink containing a polyimide resin from a dispenser (sweep rate: 6 mm/sec, nozzle inner diameter: 0.72 mm) onto the first surface in a line-like shape and subsequently performing hot-air drying. The stripe-like insulative protrusions were also formed on the second surface of the electrolytic copper foil as in the formation of the protrusions on the first surface. When the protrusions were formed on the second surface, the first and second surfaces were aligned with each other by determining the positions of four holes (diameter: 0.8 mm) formed in the respective corners of the electrolytic copper foil with a CCD camera such that the positions of the protrusions disposed on the first surface overlapped those of the protrusions disposed on the second surface when viewed in plan.

The minimum clearance P between each two of the protrusions adjacent to each other was 4 mm. The minimum width D of each two of the protrusions adjacent to each other was about 1 mm. Each of the protrusions was arranged to extend in the longitudinal direction of the electrolytic copper foil. A specific one of first regions, which also extended in the longitudinal direction of the electrolytic copper foil, was disposed between each two of the protrusions adjacent to each other. The ratio of the total area of the protrusions disposed on the first surface to the area of the first surface and the ratio of the total area of the protrusions disposed on the second surface to the area of the second surface were 23% (=[Minimum width D of protrusions: 1 mm×Length of protrusions: 75 mm×5 lines]/[Width of electrolytic copper foil: 22 mm×Length of electrolytic copper foil: 75 mm]). The resulting electrolytic copper foil was cut into a predetermined electrode size. Hereby, a negative electrode that included stripe-like protrusions formed on each of the surfaces was prepared. The protrusions were composed entirely of an insulative material as illustrated in FIG. 1.

(3) Preparation of Nonaqueous Electrolyte

FEC, EMC, and DMC were mixed at a volume ratio of FEC:EMC:DMC=20:5:75. In the resulting mixed solvent, $LiPF_6$ and $LiBF_2(C_2O_4)$ were dissolved such that the concentrations of $LiPF_6$ and $LiBF_2(C_2O_4)$ in the mixed solvent were 1 mol/L and 0.5 mol/L, respectively. Hereby, a nonaqueous liquid electrolyte was prepared.

(4) Preparation of Battery

An Al tab was attached to the positive electrode. A Ni tab was attached to the negative electrode. Subsequently, in an inert gas atmosphere, the positive and negative electrodes were wound into a spiral with a polyethylene thin-film, which served as a separator, disposed between the electrodes. Hereby, a wound electrode group was prepared. In this electrode group, the stripe-like protrusions formed on the negative electrode were in contact with the separator. The electrode group was placed in a bag-like package composed of a laminated sheet including an Al layer. After the nonaqueous electrolyte had been charged into the package accommodating the electrode group, the package was sealed. Hereby, a lithium secondary battery was prepared.

Reference Example 2

In (2) Preparation of Negative Electrode, stripe-like insulative protrusions (average height: 50 μm, minimum width D: about 1 mm) were formed on each of the surfaces of the rectangular electrolytic copper foil as in Reference example 1, except that the ink contained an acrylic resin instead of a polyimide resin. A lithium secondary battery was prepared as in Reference example 1, except that the negative electrode prepared in Reference example 2 was used.

Reference Example 3

In (2) Preparation of Negative Electrode, stripe-like insulative protrusions (average height: 52 μm, minimum width D: about 1 mm) were formed on each of the surfaces of the rectangular electrolytic copper foil as in Reference example 1, except that the ink contained 5 vol % carbon black and an acrylic resin instead of a polyimide resin. A lithium secondary battery was prepared as in Reference example 1, except that the negative electrode prepared in Reference example 3 was used.

Reference Example 4

In (2) Preparation of Negative Electrode, stripe-like insulative protrusions (average height: 50 μm, minimum width D: about 1 mm) were formed on each of the surfaces of the rectangular electrolytic copper foil as in Reference example 1, except that an ink containing 20 vol % alumina powder particles having a diameter of 3μm and a polyimide resin was used instead of the ink containing a polyimide resin. A lithium secondary battery was prepared as in Reference example 1, except that the negative electrode prepared in Reference example 4 was used.

Comparative Example 1

In (2) Preparation of Negative Electrode, stripe-like conductive protrusions (average height: 51 μm, width: about 1 mm) were formed on each of the surfaces of the rectangular electrolytic copper foil as in Reference example 1, except that a copper paste was used instead of the ink containing a polyimide resin. A lithium secondary battery was prepared as in Reference example 1, except that the negative electrode prepared in Comparative example 1 was used.

Comparative Example 2

In (2) Preparation of Negative Electrode, stripe-like conductive protrusions (average height: 50 μm, minimum width D: about 1 mm) were formed on each of the surfaces of the rectangular electrolytic copper foil as in Reference example 1, except that an ink containing 10 vol % carbon black and an acrylic resin was used instead of the ink containing a polyimide resin. A lithium secondary battery was prepared as in Reference example 1, except that the negative electrode prepared in Comparative example 2 was used.

Example 1

In (2) Preparation of Negative Electrode, stripe-like conductive protrusions (average height: 50 μm, minimum width D: about 1 mm) were formed on each of the surfaces of the rectangular electrolytic copper foil as in Reference example 1, except that an ink containing 10 vol % alumina powder particles having a diameter of 3 μm, 2.5 vol % carbon black, and a polyimide resin was used instead of the ink containing a polyimide resin. The stripe-like protrusions were composed of a composite material of a conductive material and an insulative material. It is considered that at least a part of the surfaces of the conductive material was covered with the insulative material.

A lithium secondary battery was prepared as in Reference example 1, except that the negative electrode prepared in Example 1 was used.

Evaluations

Volume Resistivity

The resistance of the protrusions was measured with a resistance meter by a four-probe method. The measured resistance was converted into resistance per unit volume by being divided by the volume of the sample disposed between the probes. Thus, the volume resistivity of the protrusions was determined. The measurement of resistance was conducted at a temperature of 20° C.±3° C. and a relative humidity of 50% or less using a high-resistance meter or a low-resistance meter, which was selected appropriately in accordance with the resistance region. The sample used in the above measurement was the material used for forming the protrusions.

Charge-Discharge Characteristics

Each of the batteries was subjected to a charge/discharge test in order to determine the charge/discharge characteristics of the battery. In the charge/discharge test, the batteries were charged under the following conditions and subsequently, after an interval of 20 minutes, discharged under the following conditions in a thermostat set at 25° C.

Charge

Each of the batteries was charged with a constant current of 10 mA per unit area (square centimeters) of the electrodes until the battery voltage reached 4.1 V and subsequently charged with a constant voltage of 4.1 V until the current per unit area of the electrodes reached 1 mA.

Discharge

Each of the batteries was discharged with a constant current of 10 mA per unit area of the electrodes until the battery voltage reached 2.5 V.

The above charge and discharge were considered as one cycle. After the batteries had been charged in the second cycle, the batteries were disassembled and the negative electrode was taken from each of the batteries. The batteries were disassembled in an inert gas atmosphere. After the negative electrodes had been cleaned with DMC and then dried, the thicknesses of the negative electrodes were measured. The thickness of each of the negative electrodes was determined by measuring the thickness of the negative electrode at five random positions with a PEACOCK Digital Thickness Gauge G2-205M and taking the average. The ratio (%) of the thickness of the negative electrode measured in the second cycle to the thickness (100%) of the current collector of the negative electrode which was measured before the charge and discharge was determined as an expansion of the negative electrode.

Table 1 summarizes the evaluation results. The expansion of the negative electrode of each of the batteries prepared in Reference examples 1 to 4 was smaller than the expansion of the negative electrode of any of the batteries prepared in Comparative examples 1 and 2. In particular, the protrusions including an insulative material which had a volume resistivity of $10^8$ Ω·cm or more significantly reduced the expansion of the negative electrode. The expansion of the negative electrode of the battery prepared in Example 1 was smaller than the expansion of the negative electrode of any of the batteries prepared in Comparative examples 1 and 2. The protrusions including an insulative material which had a volume resistivity of $10^7$ Ω·cm or more significantly reduced the expansion of the negative electrode.

TABLE 1

|  | Volume resistivity of protrusions (Ω · cm) | Negative electrode expansion coefficient (%) |
|---|---|---|
| Reference example 1 | $6.0 \times 10^{12}$ | 102 |
| Reference example 2 | $3.8 \times 10^{8}$ | 103 |
| Reference example 3 | $1.1 \times 10^{6}$ | 110 |
| Reference example 4 | $5.2 \times 10^{12}$ | 102 |
| Comparative example 1 | $7.8 \times 10^{1}$ | 136 |
| Comparative example 2 | $2.1 \times 10^{2}$ | 130 |
| Example 1 | $7.4 \times 10^{7}$ | 107 |

Example 2

A negative electrode was prepared as in Reference example 1, except that each of the protrusions was constituted by a conductive material and an insulative material that covered the entire surfaces of the conductive material except the surface acting as an interface between the conductive material and the first surface as illustrated in FIG. 2. Specifically, in (2) Preparation of Negative Electrode, stripe-like conductive materials (height: 39 μm, width: about 0.7 mm) were formed on the first surface of the electrolytic copper foil by ejecting a copper paste from a dispenser (sweep rate: 3 mm/sec, nozzle inner diameter: 0.36 mm) onto the first surface in a line-like shape and subsequently performing hot-air drying. Then, an ink containing a polyimide resin was ejected from the dispenser (sweep rate: 18 mm/sec, nozzle inner diameter: 0.72 mm) so as to cover the conductive materials. Subsequently, hot-air drying was performed. When a cross-section of the resulting stripe-like protrusions taken in the width direction was observed with a scanning electron microscope, it was confirmed that the entire surfaces of each of the conductive materials except the surface acting as an interface between the conductive material and the first surface were covered with a polyimide layer having a thickness of 10 μm, which is an example of the insulative material, as illustrated in FIG. 2. The stripe-like protrusions were also formed on the second surface of the electrolytic copper foil as in the formation of the protrusions on the first surface.

The minimum clearance P between each two of the protrusions adjacent to each other was 4 mm. The minimum width D of each two of the protrusions adjacent to each other was about 1 mm. Each of the protrusions was arranged to extend in the longitudinal direction of the electrolytic copper foil. A specific one of first regions, which also extended in the longitudinal direction of the electrolytic copper foil, was disposed between each two of the protrusions adjacent to each other. The ratio of the total area of the protrusions disposed on the first surface to the area of the first surface and the ratio of the total area of the protrusions disposed on the second surface to the area of the second surface were 23% (=[Minimum width D of protrusions: 1 mm×Length of protrusions: 75 mm×5 lines]/[Width of electrolytic copper foil: 22 mm×Length of electrolytic copper foil: 75 mm]). A lithium secondary battery was prepared as in Reference example 1, except that the negative electrode prepared in Example 2 was used.

Example 3

A negative electrode was prepared as in Reference example 1, except that each of the protrusions was constituted by a conductive material and an insulative material that covered a surface of the conductive material which faced the positive electrode as illustrated in FIG. 3. Specifically, in (2) Preparation of Negative Electrode, stripe-like conductive materials (height: 41 μm, width: about 1 mm) were formed on the first surface of the electrolytic copper foil by ejecting a copper paste from a dispenser (sweep rate: 12 mm/sec, nozzle inner diameter: 0.72 mm) onto the first surface in a line-like shape and subsequently performing hot-air drying. Then, an ink containing a polyimide resin was ejected from the dispenser (sweep rate: 18 mm/sec, nozzle inner diameter: 0.72 mm) so as to overlap the conductive materials. Subsequently, hot-air drying was performed. When a cross-section of the resulting stripe-like protrusions taken in the width direction was observed with a scanning electron microscope, it was confirmed that a surface of each of the conductive materials which faced the positive electrode was covered with a polyimide layer (i.e., the insulative material) having a thickness of 10μm as illustrated in FIG. 3. The stripe-like protrusions were also formed on the second surface of the electrolytic copper foil as in the formation of the protrusions on the first surface.

The minimum clearance P between each two of the protrusions adjacent to each other was 4 mm. The minimum width D of each two of the protrusions adjacent to each other was about 1 mm. Each of the protrusions was arranged to extend in the longitudinal direction of the electrolytic copper foil. A specific one of first regions, which also extended in the longitudinal direction of the electrolytic copper foil, was disposed between each two of the protrusions adjacent to each other. The ratio of the total area of the protrusions disposed on the first surface to the area of the first surface and the ratio of the total area of the protrusions disposed on the second surface to the area of the second surface were 23%. A lithium secondary battery was prepared as in Reference example 1, except that the negative electrode prepared in Example 3 was used.

Table 2 summarizes the evaluation results. The results of Reference example 1 and Example 2 confirm that it is possible to achieve a high charge/discharge efficiency while reducing the expansion of the negative electrode even in the case where the protrusions are composed entirely of an insulative material or the entire surfaces of the conductive material included in each of the protrusions except the surface acting as an interface between the conductive material and the first surface are covered with an insulative material. The charge/discharge efficiency is particularly enhanced when an insulative material is disposed on a surface of the conductive material included in each of the protrusions which faces the positive electrode as in Example 3. This is presumably because the conductive material exposed at each of the protrusions facilitates the dissolution of lithium which occurs during discharge.

TABLE 2

| | Arrangement of insulative material | Negative electrode expansion coefficient (%) | Charge/discharge efficiency (%) |
|---|---|---|---|
| Reference example 1 | FIG. 1 | 102 | 98.1 |
| Example 2 | FIG. 2 | 102 | 98.1 |
| Example 3 | FIG. 3 | 103 | 99.4 |
| Comparative example 1 | No insulative material | 136 | 99.0 |

Since the lithium secondary battery according to the present disclosure may reduce the expansion of the electrode, have a large discharge capacity, and be excellent in terms of safety, it may be used in, for example, electronic devices, such as mobile phones, smartphones, and tablet terminals; electric vehicles, such as hybrid electric vehicles and plug-in hybrid electric vehicles; and home storage batteries used in combination with solar batteries.

What is claimed is:

1. A lithium secondary battery comprising:
   a positive electrode containing a positive electrode active material containing lithium;
   a negative electrode facing the positive electrode;
   a separator disposed between the positive and negative electrodes; and
   a nonaqueous electrolyte having lithium-ion conductivity, wherein
      the negative electrode includes a negative electrode current collector, the negative electrode current collector includes:
         a layer having a first surface on which lithium metal is deposited during charge; and
         protrusions protruding from the first surface, wherein
            at least one of the protrusions includes a conductive material and an insulative material, and
            the insulative material covers an entire surface of the conductive material.

2. The lithium secondary battery according to claim 1, wherein at least one of the protrusions is arranged to come into contact with the separator.

3. The lithium secondary battery according to claim 1, wherein the insulative material has a volume resistivity of $10^6$ Ω·cm or more.

4. The lithium secondary battery according to claim 3, wherein the insulative material has a volume resistivity of $10^8$ Ω·cm or more.

5. The lithium secondary battery according to claim 1, wherein the negative electrode current collector has a first edge and a second edge opposite to the first edge, the first surface includes at least one first region, the first region has a band-like shape, and connects the first edge to the second edge, and none of the protrusions is disposed in the at least one first region.

6. The lithium secondary battery according to claim 1, wherein, in a projection of the protrusions on the first surface, each of the protrusions is line-like, and on the first surface, a minimum clearance between adjacent two of the protrusions is larger than a minimum width of the two adjacent protrusions.

7. The lithium secondary battery according to claim 1, wherein, in a projection of the protrusions on the first surface, the ratio $(A_{t1}/A_1) \times 100\%$ is 0.2% or more and 70% or less, where $A_{t1}$ is a total area of the first protrusions, and $A_1$ is an area of the first surface.

8. The lithium secondary battery according to claim 1, wherein the average height of the protrusions above the first surface is 15 μm or more and 120 μm or less.

9. The lithium secondary battery according to claim 1, wherein the nonaqueous electrolyte includes lithium ions and anions, and the anions include at least one type of anion selected from the group consisting of $PF_6^-$, anions of imides, and anions of oxalates.

10. The lithium secondary battery according to claim 1, wherein the insulative material includes at least one material selected from the group consisting of a fluororesin, polyacrylonitrile, a polyimide resin, an acrylic resin, a polyolefin resin, a urethane resin, a polycarbonate resin, an epoxy resin, a rubber resin, and a cellulose resin.

11. The lithium secondary battery according to claim 1, wherein the insulative material includes at least one nonconductive inorganic filler selected from the group consisting of a metal oxide, a borate salt, a phosphate salt, a carbide, a nitride, a boride, a hydroxide, a carbonate salt, a sulfate salt, and a nitrate salt.

12. The lithium secondary battery according to claim 1, wherein the conductive material and the layer are formed in one piece using the same material.

13. A lithium secondary battery comprising:
a positive electrode containing a positive electrode active material containing lithium;
a negative electrode facing the positive electrode;
a separator disposed between the positive and negative electrodes; and
a nonaqueous electrolyte having lithium-ion conductivity, wherein
the negative electrode includes a negative electrode current collector, the negative electrode current collector includes:
a layer having a first surface on which lithium metal is deposited during charge; and
a plurality of protrusions protruding from the first surface, wherein
the protrusions are spaced from each other,
each protrusion of the plurality of protrusions includes a conductive material and an insulative material, and
the insulative material is disposed only on an upper surface of each protrusion and does not contact an adjacent protrusion.

14. The lithium secondary battery according to claim 13, wherein the upper surface is a surface facing the positive electrode.

15. The lithium secondary battery according to claim 13, wherein at least one of the protrusions contacts with the separator.

16. The lithium secondary battery according to claim 13, wherein the insulative material has a volume resistivity of $10^6$ Ω·cm or more.

17. The lithium secondary battery according to claim 13, wherein, in a projection of the protrusions on the first surface,
each of the protrusions is line-like, and
on the first surface, a minimum clearance between adjacent two of the protrusions is larger than a minimum width of the two adjacent protrusions.

18. The lithium secondary battery according to claim 13, wherein the nonaqueous electrolyte includes lithium ions and anions, and
the anions include at least one type of anion selected from the group consisting of $PF_6^-$, anions of imides, and anions of oxalates.

19. The lithium secondary battery according to claim 13, wherein the insulative material includes at least one material selected from the group consisting of a fluororesin, polyacrylonitrile, a polyimide resin, an acrylic resin, a polyolefin resin, a urethane resin, a polycarbonate resin, an epoxy resin, a rubber resin, and a cellulose resin.

20. The lithium secondary battery according to claim 13, wherein the insulative material includes at least one nonconductive inorganic filler selected from the group consisting of a metal oxide, a borate salt, a phosphate salt, a carbide, a nitride, a boride, a hydroxide, a carbonate salt, a sulfate salt, and a nitrate salt.

* * * * *